(12) United States Patent
Nishimura

(10) Patent No.: US 11,275,954 B2
(45) Date of Patent: Mar. 15, 2022

(54) INFORMATION PROCESSING APPARATUS, INFORMATION PROCESSING METHOD, AND INFORMATION PROCESSING SYSTEM

(71) Applicant: TOYOTA JIDOSHA KABUSHIKI KAISHA, Toyota (JP)

(72) Inventor: Kazuya Nishimura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 16/026,874

(22) Filed: Jul. 3, 2018

(65) Prior Publication Data

US 2019/0034738 A1    Jan. 31, 2019

(30) Foreign Application Priority Data

Jul. 28, 2017    (JP) .............................. JP2017-147073

(51) Int. Cl.
*G06K 9/00* (2006.01)
*G01S 19/13* (2010.01)

(52) U.S. Cl.
CPC ..... *G06K 9/00791* (2013.01); *G06K 9/00268* (2013.01); *G06K 9/00288* (2013.01); *G06K 9/00832* (2013.01); *G01S 19/13* (2013.01); *G06K 2209/23* (2013.01)

(58) Field of Classification Search
None
See application file for complete search history.

(56) References Cited

U.S. PATENT DOCUMENTS

| 9,576,189 | B2* | 2/2017 | Lim .................. G06K 9/00221 |
| 2016/0063315 | A1 | 3/2016 | Lim et al. |
| 2018/0107880 | A1* | 4/2018 | Danielsson ........ G06K 9/00268 |
| 2020/0057445 | A1* | 2/2020 | Bennie .................. B64C 39/024 |

FOREIGN PATENT DOCUMENTS

| CN | 105389490 A | | 3/2016 |
| JP | 2001-333419 A | | 11/2001 |
| JP | 2013069128 A | | 4/2013 |
| JP | 2014191664 | * | 10/2014 |
| JP | 2015-111906 A | | 6/2015 |
| JP | 2017-058806 A | | 3/2017 |
| JP | 2018132803 A | * | 8/2018 |

* cited by examiner

*Primary Examiner* — Fan Zhang
(74) *Attorney, Agent, or Firm* — Hunton Andrews Kurth LLP

(57) ABSTRACT

An information processing apparatus includes an acquisition unit configured to acquire an image captured by an imaging device mounted in a vehicle, and a determination unit configured to perform image recognition on the image acquired by the acquisition unit to perform determination about whether or not a monitoring target registered in advance is included. The determination unit performs the determination on an image captured in a geographical range set in association with the monitoring target.

9 Claims, 12 Drawing Sheets

FIG. 9

| REGISTRATION ID | USER ID | PASSWORD | WATCHING PERSON'S NAME | WATCHED PERSON'S NAME | WATCHING PERSON'S CONTACT | MONITORING AREA | LEARNING DATA | ELECTRIC WAVE ID |
|---|---|---|---|---|---|---|---|---|
| ... | ... | ... | ... | ... | ... | ... | ... | ... |
| ... | ... | ... | ... | ... | ... | ... | ... | ... |
| .. | .. | .. | .. | .. | .. | .. | .. | .. |

111

| REGISTRATION ID | MONITORING AREA INFORMATION |
|---|---|
| ... | ... |
| ... | ... |
| : | : |

INFORMATION PROCESSING APPARATUS, INFORMATION PROCESSING METHOD, AND INFORMATION PROCESSING SYSTEM

INCORPORATION BY REFERENCE

The disclosure of Japanese Patent Application No. 2017-147073 filed on Jul. 28, 2017 including the specification, drawings and abstract is incorporated herein by reference in its entirety.

BACKGROUND

1. Technical Field

The present disclosure relates to an information processing apparatus, an information processing method, and an information processing system.

2. Description of Related Art

In the related art, a technique in which, for the purpose of searching for a lost child, an aged wanderer, or the like, images captured by a large number of cameras are compared with image information or character information indicating a search target input in advance to determine whether or not there is information indicating the search target among the captured images has been examined (for example, Japanese Unexamined Patent Application Publication No. 2001-333419 (JP 2001-333419 A)).

SUMMARY

In the technique of JP 2001-333419 A, a processing load for determining whether or not there is information indicating the search target among the captured images may be increased with the increase in the number of captured images, and an efficient search may become difficult.

The disclosure provides an information processing apparatus, an information processing method, and an information processing system capable of improving efficiency of monitoring using captured images.

A first aspect of the disclosure relates to an information processing apparatus. The information processing apparatus includes an acquisition unit and a determination unit. The acquisition unit is configured to acquire an image captured by an imaging device mounted in a vehicle. The determination unit is configured to perform image recognition on the image acquired by the acquisition unit to perform determination about whether or not a monitoring target registered in advance is included. The determination unit performs the determination on the image captured in a geographical range set in association with the monitoring target.

According to the first aspect of the disclosure, it is possible to limit a target of the determination about whether or not the monitoring target registered in advance is included to the image captured in the geographical range set in association with the monitoring target.

Accordingly, it is possible to improve efficiency of monitoring using captured images.

In the information processing apparatus according to the first aspect of the disclosure, the acquisition unit may acquire the image captured in the geographical range.

According to the first aspect of the disclosure, it is possible to limit an image to be acquired to the image captured in the geographical range set in association with the monitoring target.

Accordingly, it is possible to improve efficiency of monitoring using captured images.

In the information processing apparatus according to the first aspect of the disclosure, the geographical range may be specified based on a predetermined district, a range designated using a map, or a history of positional information recorded in a predetermined portable terminal.

According to the first aspect of the disclosure, it is possible to designate the geographical range using various methods.

Accordingly, it is possible to designate the geographical range suitable for the monitoring target.

In the information processing apparatus according to the first aspect of the disclosure, the geographical range may be set as desired in a terminal connected through a network.

According to the first aspect of the disclosure, it is possible to designate the geographical range as desired by a user.

Accordingly, it is possible to designate the geographical range suitable for the monitoring target.

In the information processing apparatus according to the first aspect of the disclosure, an agreement on acquisition of an image of the monitoring target is made in advance, and the determination unit may perform image recognition on the image of the monitoring target acquired by the acquisition unit.

According to the first aspect of the disclosure, it is possible to perform image recognition on the image of the monitoring target to which agreement on acquisition is made in advance.

Accordingly, it is possible to prevent the occurrence of a problem with handling of an image captured without permission of a person concerned.

In the information processing apparatus according to the first aspect of the disclosure, the determination unit may perform the image recognition using first information extracted from a face image of a person of the monitoring target or second information extracted from an image of an article on the person and the first information.

According to the first aspect of the disclosure, image recognition is performed based on information for allowing relatively high distinction between the monitoring target and another person.

Accordingly, it is possible to increase a possibility capable of detecting the monitoring target from images.

In the information processing apparatus according to the first aspect of the disclosure, the acquisition unit may acquire an image captured by the imaging device and positional information indicating a position where the image is captured. When the monitoring target is included in the image acquired by the acquisition unit, the determination unit may store the positional information in a storage unit in association with the monitoring target.

According to the first aspect of the disclosure, it is possible to specify the position of the monitoring target even though the monitoring target does not have a specific transmitter or the like.

Accordingly, it is possible to improve efficiency in monitoring the monitoring target.

The information processing apparatus according to the first aspect of the disclosure may further include a providing unit configured to, according to a request from a terminal connected through a network, provide the terminal with the positional information stored in the storage unit.

According to the first aspect of the disclosure, it is possible to provide the positional information of the monitoring target according to a request from a monitor.

Accordingly, it is possible to improve efficiency in monitoring the monitoring target.

A second aspect of the disclosure relates to an information processing method. The information processing method includes, with a computer, acquiring an image captured by an imaging device mounted in a vehicle, and performing image recognition on the acquired image to perform determination about whether or not a monitoring target registered in advance is included. The determination is determination on an image captured in a geographical range set in association with the monitoring target.

According to the second aspect of the disclosure, it is possible to limit an image to be acquired to the image captured in the geographical range set in association with the monitoring target.

Accordingly, it is possible to improve efficiency of monitoring using captured images.

A third aspect of the disclosure relates to an information processing system. The information processing system includes an in-vehicle device and an information processing apparatus. The in-vehicle device is mounted in a vehicle. The information processing apparatus is configured to perform communication with the in-vehicle device through a network. The information processing system includes an acquisition unit and a determination unit. The acquisition unit is configured to acquire an image captured by an imaging device mounted in a vehicle. The determination unit is configured to perform image recognition on the image acquired by the acquisition unit to perform determination about whether or not a monitoring target registered in advance is included. The determination unit performs the determination on an image captured in a geographical range set in association with the monitoring target.

According to the third aspect of the disclosure, it is possible to limit an image to be acquired to the image captured in the geographical range set in association with the monitoring target.

Accordingly, it is possible to improve efficiency of monitoring using captured images.

According to the aspects of the disclosure, it is possible to improve efficiency of monitoring using captured images.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9 is a table showing a configuration example of a registration information storage unit;

FIG. 12 is a flowchart illustrating an example of a processing procedure that the in-vehicle device executes when the accessory power supply is ON;

DETAILED DESCRIPTION OF EMBODIMENTS

Figure 1:
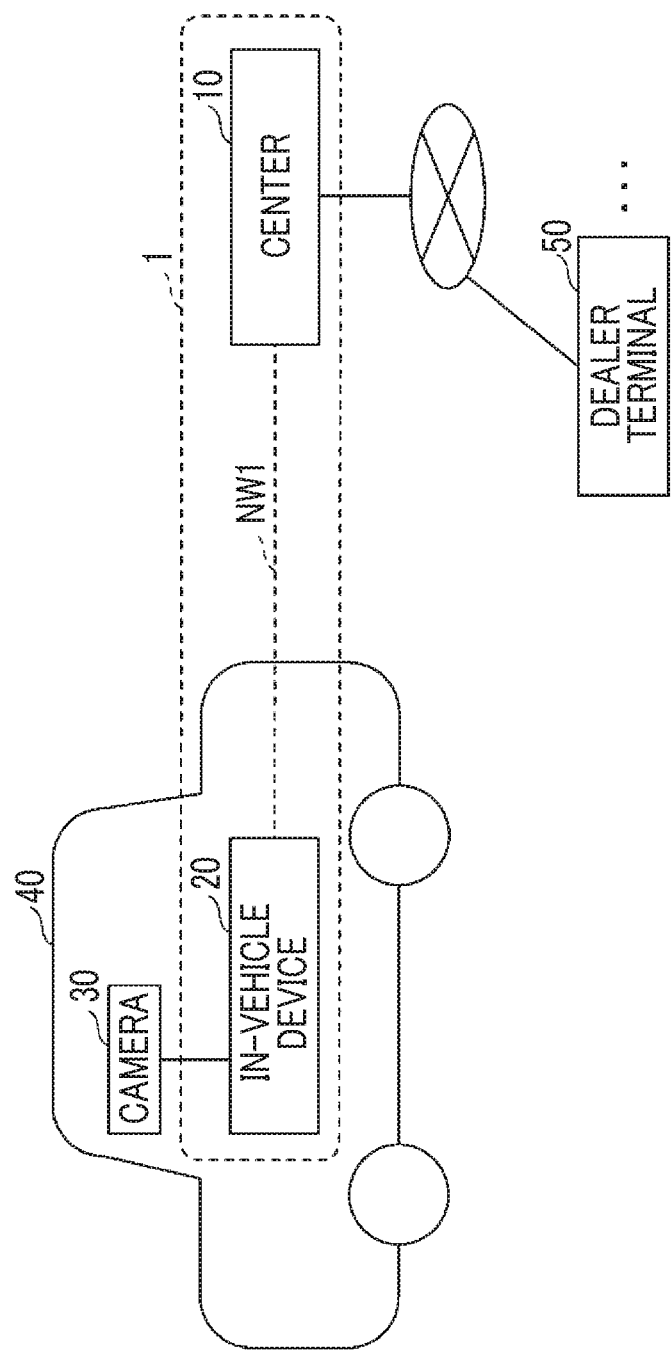
FIG. 1 is a diagram showing a configuration example of an information processing system according to an embodiment.

Hereinafter, an embodiment will be described referring to the drawings. FIG. 1 is a diagram showing a configuration example of an information processing system 1 according to the embodiment. In FIG. 1, the information processing system 1 includes an in-vehicle device 20 and a center 10. The in-vehicle device 20 and the center 10 can perform communication through a predetermined communication network NW1 including a mobile communication network (wireless communication network) with a large number of base stations as terminals, the Internet, or the like. In FIG. 1, for convenience, solely one in-vehicle device 20 is shown; however, the in-vehicle device 20 of each of a plurality of vehicles 40 can perform communication with the center 10 through the communication network NW1.

The in-vehicle device 20 is a device that is mounted in the vehicle 40 and has an information processing function and a communication function. For example, the in-vehicle device 20 may include a navigation system. In the embodiment, the in-vehicle device 20 is connected to a camera 30 provided in the vehicle 40 so as to capture an image forward of the vehicle 40, receives a moving image captured by the camera 30 as input, and transmits a still image (image data) extracted from the moving image to the center 10. The camera 30 may be, for example, a camera that is provided for the purpose of a drive recorder or driving assistance.

The center 10 is a set of one or more computers (information processing apparatuses). In the embodiment, the center 10 performs processing for detecting an image of a person designated as a watched person from image data collected from the in-vehicle device 20 of each vehicle 40.

In FIG. 1, one or more dealer terminals 50 are connected to the center 10 through a network, such as the Internet. The dealer terminal 50 is, for example, a terminal such as a personal computer (PC) that is installed in each store of a dealer (distributor) of the vehicle 40. The dealer terminal 50 is used for registration or the like of an image of the watched person.

The watched person refers to a person who is taken as a monitoring target (watching target) by a person in a position as a watching person (monitor) and is registered as a watched person in the center 10 through the dealer terminal 50. For example, a case where the watched person is a child and the watching person is a parent of the child is considered. Furthermore, a case where the watched person is an aged parent and the watching person is a son, a daughter, or the like of the aged parent is also considered. However, the relationship of the watched person and the watching person is not limited to the above-described relationship.

In the embodiment, watching (monitoring) of the watched person can be performed using images captured by the cameras 30 of a plurality of vehicles 40.

Figure 2:
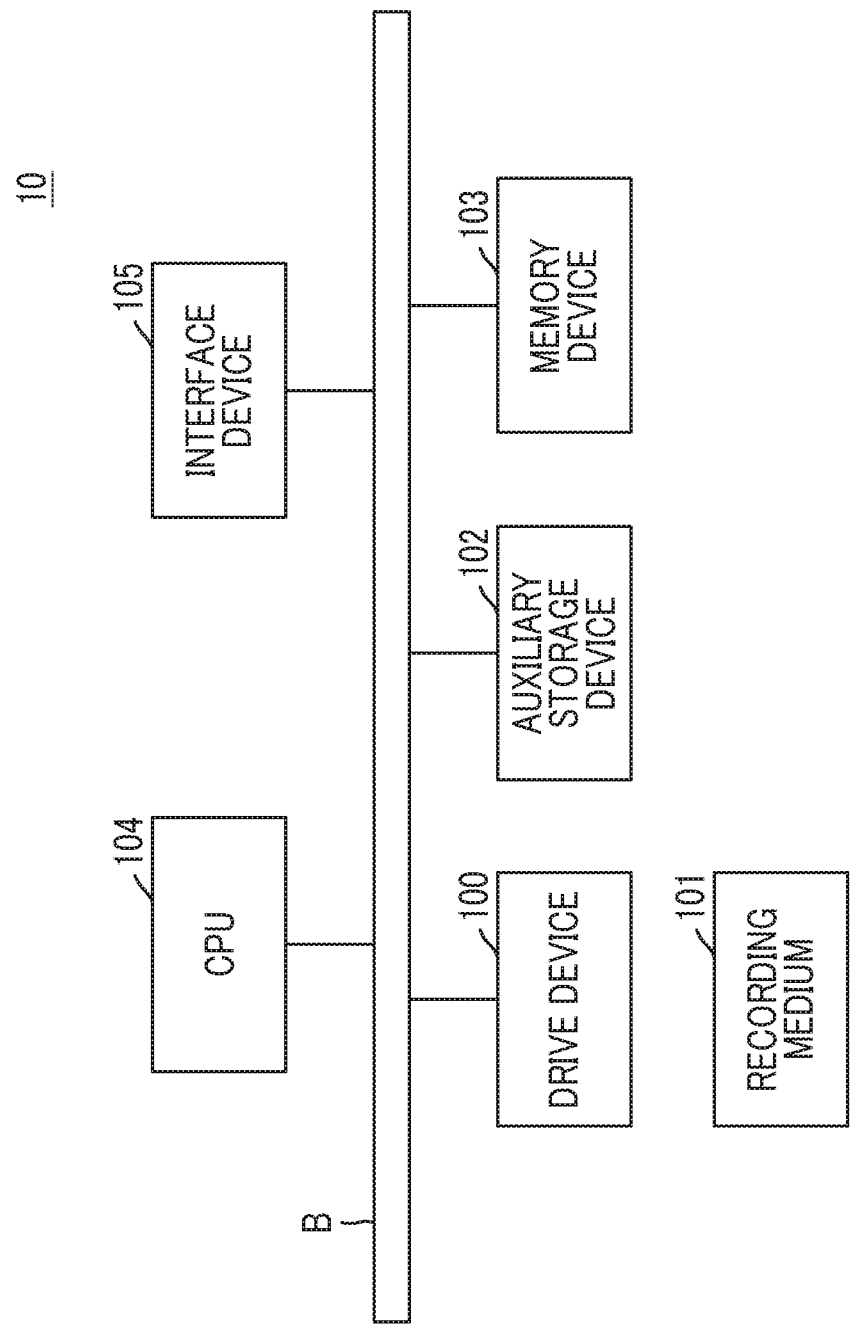
FIG. 2 is a diagram showing a hardware configuration example of a center according to the embodiment.

FIG. 2 is a diagram showing a hardware configuration example of the center 10 according to the embodiment. The center 10 of FIG. 2 has a drive device 100, an auxiliary storage device 102, a memory device 103, a central processing unit (CPU) 104, an interface device 105, and the like connected to one another by a bus B.

A program that realizes processing in the center 10 is provided through a recording medium 101, such as a compact disk-read only memory (CD-ROM). In a case where the recording medium 101 storing the program is set in the drive device 100, the program is installed on the auxiliary storage device 102 from the recording medium 101 through the drive device 100. However, the installation of the program does not need to be performed from the recording medium 101, and the program may be downloaded from another computer through the network. The auxiliary storage device 102 stores the installed program, and stores needed files, data, or the like.

The memory device 103 reads the program from the auxiliary storage device 102 and stores the program in a case where there is a start instruction of the program. The CPU 104 executes functions relates to the center 10 according to the program stored in the memory device 103. The interface device 105 is used as an interface for connection to the network.

Figure 3:
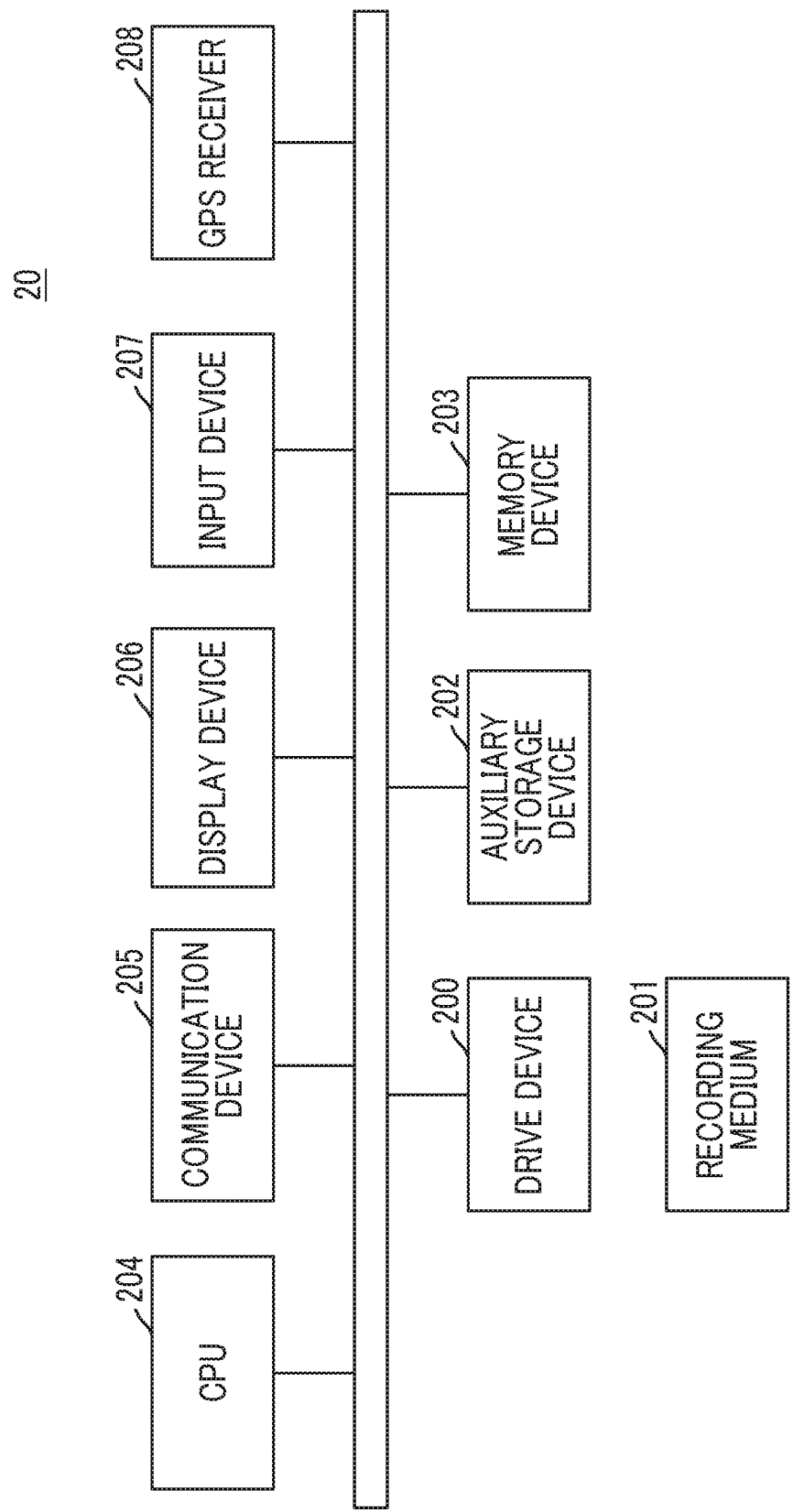
FIG. 3 is a diagram showing a hardware configuration example of an in-vehicle device according to the embodiment.

FIG. 3 is a diagram showing a hardware configuration example of the in-vehicle device 20 according to the embodiment. The in-vehicle device 20 of FIG. 3 has a drive device 200, an auxiliary storage device 202, a memory device 203, a CPU 204, a communication device 205, a display device 206, an input device 207, a GPS receiver 208, and the like.

A program that realizes processing in the in-vehicle device 20 is provided through a recording medium 201, such as a secure digital (SD) memory card. In a case where the recording medium 201 storing the program is set in the drive device 200, the program is installed on the auxiliary storage device 202 from the recording medium 201 through the drive device 200. However, the installation of the program does not need to be performed from the recording medium 201, and the program may be downloaded from another computer through the network. The auxiliary storage device 202 stores the installed program, and stores needed files, data, or the like.

The memory device 203 reads the program from the auxiliary storage device 202 and stores the program in a case where there is a start instruction of the program. The CPU 204 realizes functions related to the in-vehicle device 20 according to the program stored in the memory device 203. The communication device 205 is a device for connection to the network through wireless communication. The communication device 205 may be realized using, for example, a data communication module (DCM). The display device 206 is, for example, a liquid crystal display or the like, and displays a graphical user interface (GUI) or the like by the program. The input device 207 is used to allow a user to input various operation instructions. For example, the input device 207 may be a touch panel. The GPS receiver 208 receives GPS signals transmitted from global positioning system (GPS) satellites and measures a current position of the vehicle 40 based on the GPS signals.

Figure 4:
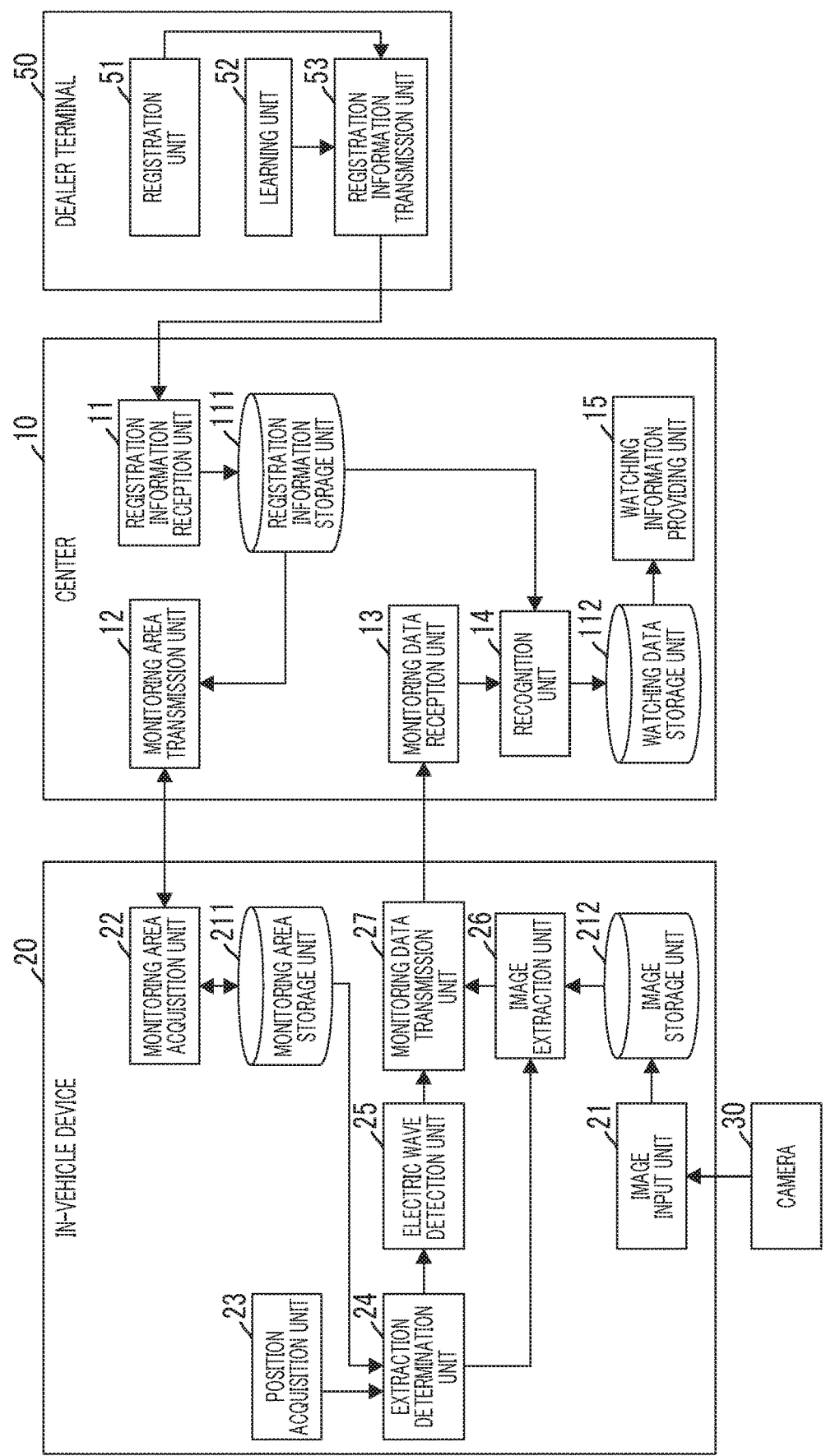
FIG. 4 is a diagram showing a functional configuration example of a dealer terminal, a center, and an in-vehicle device according to the embodiment.

FIG. 4 is a diagram showing a functional configuration example of the dealer terminal 50, the center 10, and the in-vehicle device 20 according to the embodiment. In FIG. 4, the dealer terminal 50 has a registration unit 51, a learning unit 52, a registration information transmission unit 53, and the like. The units are realized by processing that is performed on a CPU of the dealer terminal 50 by one or more programs installed on the dealer terminal 50.

The registration unit 51 receives an input of information relating to the watching person and the watched person. For example, in addition to the names of the watching person and the watched person, a monitoring area, a face image of the watched person, or the like is input. Furthermore, as needed, an electric wave ID of an electric wave of a portable terminal carried with the watched person, an image of clothes of the watched person, or an image of an article on the watched person, such as belongings (a bag or the like) of the watched person, or the like is input. The monitoring area refers to a geographical range designated as a range for monitoring the watched person as desired by the watching person.

The learning unit 52 extracts a feature quantity from the face image of the watched person and generates learning data relating to the face image of the watched person based on the feature quantity. In the embodiment, although a support vector machine (SVM) is assumed as a learning model, in a case where another learning model is used, information suitable for another learning model may be extracted from the face image. Furthermore, in a case where another image, such as an image of clothes of the watched person or the image of belongings of the watched person, is input, the learning unit 52 generates learning data similarly regarding another image. Accordingly, one or more pieces of learning data are generated for one watched person.

The registration information transmission unit 53 transmits, to the center 10, registration information including information with input being received by the registration unit 51, learning data generated by the learning unit 52, and the like.

The center 10 has a registration information reception unit 11, a monitoring area transmission unit 12, a monitoring data reception unit 13, a recognition unit 14, a watching information providing unit 15, and the like. The units are realized by processing that is performed on the CPU 104 by one or more programs installed on the center 10. Furthermore, the center 10 uses a registration information storage unit 111 and a watching data storage unit 112. The storage units can be realized using, for example, the auxiliary storage device 102, a storage device connectable to the center 10 through a network, or the like.

The registration information reception unit 11 receives the registration information transmitted from the dealer terminal 50 and stores the registration information in the registration information storage unit 111. Accordingly, basically, the registration information is stored in the registration information storage unit 111 for each pair of a watching person and a watched person.

The monitoring area transmission unit 12 transmits, to the in-vehicle device 20 of each vehicle 40, information (hereinafter, referred to as "monitoring area information") indicating each monitoring area included in each piece of registration information stored in the registration information storage unit 111, for example.

The monitoring data reception unit 13 receives, from the in-vehicle device 20, monitoring data including image data captured by the camera 30 of the vehicle 40 when the vehicle 40 mounted with the in-vehicle device 20 is located in any monitoring area, positional information of the vehicle 40 when the image data is captured, the date and time on which the image is captured, and the like transmitted from the in-vehicle device 20 that receives the monitoring area information.

The recognition unit 14 performs image recognition processing on the image data included in the received monitoring data using learning data stored in the registration information storage unit 111 to perform personal identification (that is, detection of any watched person). In a case where any watched person is detected from the image data included in the received monitoring data, the recognition unit 14 stores data the monitoring data and an identifier (registration ID) of the registration information related to the watched person as watching data in the watching data storage unit 112.

The watching information providing unit 15 provides, according to a request from a terminal that the watching person uses, the terminal with one or more pieces of watching data (that is, a history of positional information of the watched person, or the like) related to the watched person by the watching person.

The in-vehicle device 20 has an image input unit 21, a monitoring area acquisition unit 22, a position acquisition unit 23, an extraction determination unit 24, an electric wave detection unit 25, an image extraction unit 26, a monitoring data transmission unit 27, and the like.

The units are realized by processing that is performed on the CPU 204 by one or more programs installed on the in-vehicle device 20. Furthermore, the in-vehicle device 20 has a monitoring area storage unit 211, an image storage unit 212, and the like. The storage units can be realized using, for example, an auxiliary storage device 202 or the like.

The image input unit 21 inputs an image (moving image) captured by the camera 30 in a predetermined format and stores the image in the image storage unit 212 in a moving image format, such as MP4.

The monitoring area acquisition unit 22 acquires (receives) the monitoring area information from the center 10 and stores the acquired monitoring area information in the monitoring area storage unit 211.

The position acquisition unit 23 acquires positional information indicating the current position of the vehicle 40 from the GPS receiver 208. The extraction determination unit 24 determines a need for extraction (acquisition) of image data from the image storage unit 212 based on whether or not the current position of the vehicle 40 is within a monitoring area indicated by any monitoring area information stored in the monitoring area storage unit 211.

In a case where the vehicle 40 is located within any monitoring area, the electric wave detection unit 25 attempts to detect an electric wave from a portable terminal. In a case where the electric wave can be detected, the electric wave detection unit 25 acquires the electric wave ID of the electric wave. The image extraction unit 26 extracts (acquires), from the image storage unit 212, image data captured when the extraction determination unit 24 determines that there is a need for extraction of image data.

The monitoring data transmission unit 27 transmits, to the center 10, monitoring data including the image data extracted by the image extraction unit 26, the positional information acquired by the position acquisition unit 23, the date and time on which the image data is captured, and the like. In a case where the electric wave ID is acquired by the electric wave detection unit 25, the electric wave ID is also included in the monitoring data.

Hereinafter, a processing procedure that is executed in the information processing system 1 or the like will be described. First, the watching person and the watched person need to visit the dealer of the vehicle 40 and register the watched person. In the registration, the dealer terminal 50 is used.

Figure 5:
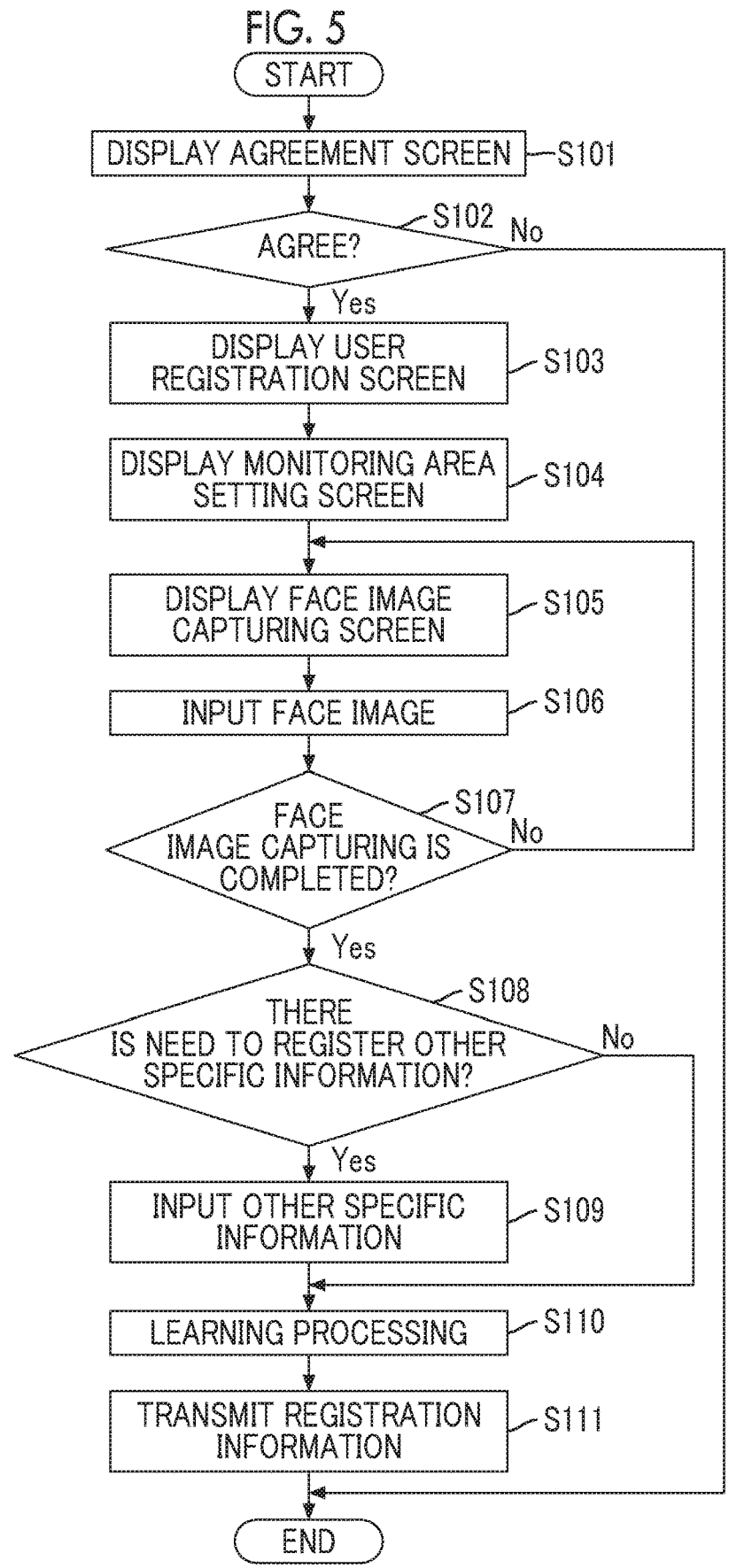
FIG. 5 is a flowchart illustrating an example of a processing procedure that the dealer terminal executes.

FIG. 5 is a flowchart illustrating an example of a processing procedure that the dealer terminal 50 executes.

In a case where an instruction to register the watching person and the watched person is input, the registration unit 51 of the dealer terminal 50 displays an agreement screen (S101). On the agreement screen, in a case where an image of the watched person is captured by the camera 30 of an unspecified vehicle 40 in a range (monitoring area) designated in a subsequent step, an agreement for the image to be acquired, the image and positional information of an imaging position of the image to be managed, and the like is displayed.

In a case where the effect that the agreement displayed on the agreement screen is not agreed is input to the dealer terminal 50 (in S102, No), registration fails, and the processing of FIG. 5 ends. In a case where the effect that the agreement is agreed is input to the dealer terminal 50 (in S102, Yes), the process progresses to Step S103. In a case where the agreement is agreed, monitoring of the watched person is enabled, whereby it is possible to prevent the occurrence of a problem with handling of an image captured without permission of a person concerned.

In Step S103, the registration unit 51 displays a user registration screen. On the user registration screen, for example, a user ID, a password, the name of each of the watching person and the watched person, and a contact (for example, a mail address or the like) of the watching person are input. The user ID and the password are a user ID and a password that the watching person needs to input when viewing a screen showing a history of locations of the watched person.

Subsequently, the registration unit 51 displays a monitoring area setting screen (S104). The monitoring area setting screen is a screen for receiving a setting of a range of a monitoring area. For example, an input address or a peripheral map of the vicinity of a current point (a store of the dealer) is displayed on the monitoring area setting screen, and a monitoring area is set by a predetermined operation on the map. For example, in a case where the watched person is a child who is going to an elementary school, a predetermined district, such as a school district of the elementary school, may be taken as an initial value of a monitoring area. The boundary of the initial value may be expanded or reduced, such that a final monitoring area may be set.

A setting method of a monitoring area is not limited to a specific method. A plurality of monitoring areas may be set. For example, in a case where the watched person carries with a portable terminal with a GPS function, such as a smartphone or a mobile phone, a history of positional information recorded in the portable terminal may be input to the dealer terminal 50, and a range specified based on the history of the positional information may be taken as a monitoring area. In this case, for example, the minimum rectangular range including all histories of positional information may be taken as a monitoring area, or a range including a part of histories of positional information may be taken as a monitoring area. In a case where the watched person is an adult, such as an aged person, and in a case where there is a possibility that the watched person is moved by a vehicle, a movement history of the vehicle may be used instead of the history of the positional information of the portable terminal. For example, the movement history may be downloaded from the center 10 to the dealer terminal 50 based on an ID or the like of the vehicle. As described above, a monitoring area may be set as desired by the watching person using various methods. In this way, it is possible to set a monitoring area suitable for the watched person.

In a case where setting of a monitoring area is completed, the registration unit 51 displays a face image capturing screen (S105). The face image capturing screen is a screen on which a message indicating a posture to be taken by the watched person, or the like is displayed when an image (face image) of a face of the watched person is captured by a camera 30 (for example, a Web camera 30 or the like) connected to the dealer terminal 50, for example.

Subsequently to the display of the face image capturing screen, the registration unit 51 receives the face image captured by the camera 30 as input (S106). Since it is preferable that the face image is captured, for example, from a plurality of angles, Steps S105 and S106 are repeated by the number of angles. In the interim, the face images captured by the camera 30 are input as a moving image. However, a still image captured at each angle may be input.

Figure 6:
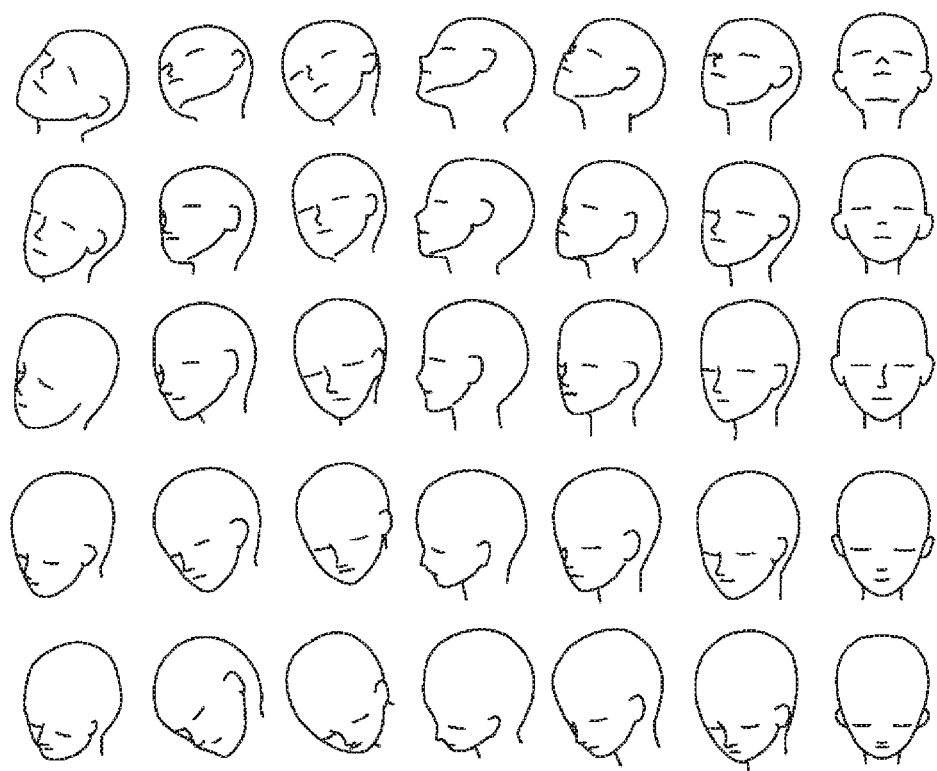
FIG. 6 is a diagram showing an example of face images from a plurality of angles.

FIG. 6 is a diagram showing an example of face images from a plurality of angles. Steps S105 and S106 are repeated, whereby the face images shown in FIG. 6 are input.

In a case where imaging of the face image is completed (in S107, Yes), the registration unit 51 determines a need for registration of other specific information (S108). For example, the registration unit 51 displays a screen for inquiring of the need for registration of other specific information and performs the above-described determination based on an input on the screen.

Other kinds of specific information refer to, for example, information useful for specifying and detecting a watched person (information for allowing relatively high distinction between the watched person and another person), such as an image of clothes (for example, a uniform or the like) that the watched person puts on at a relatively high frequency or an image of an article (for example, a bag or the like) that the watched person carries at a relatively high frequency, other than the face image. An ID of an electric wave of a portable terminal carried with the watched person (for example, an electric wave ID of Bluetooth (Registered Trademark)) or the like may be included in other specific information. In addition to the face image, information for allowing relatively high distinction between the watched person and another person is used, whereby it is possible to further increase a possibility that the watched person can be detected from captured images.

In a case where other specific information is registered (in S108, Yes), the registration unit 51 receives other specific information as input (S109). For example, an image of clothes, an image of belongings, an electric wave ID, or the like is input. The image described above may be captured by the camera 30 connected to the dealer terminal 50. Alternatively, in a case where an image corresponding to a portable terminal of the watching person or the watched person is stored, the image may be input from the portable terminal to the dealer terminal 50. The electric wave ID may be input when the dealer terminal 50 receives an electric wave emitted from the portable terminal.

In a case where other specific information is not registered (in S108, No), Step S109 is not performed.

Subsequently, the learning unit 52 performs learning processing on one or more input face images (S110). Specifically, the learning unit 52 extracts a feature quantity (numerical data) from each face image. The learning unit 52 generates learning data regarding the face of the watched person based on the extracted feature quantity and feature quantities extracted from face images of an unspecified large number of other people registered in the dealer terminal 50 in advance.

Figure 7:
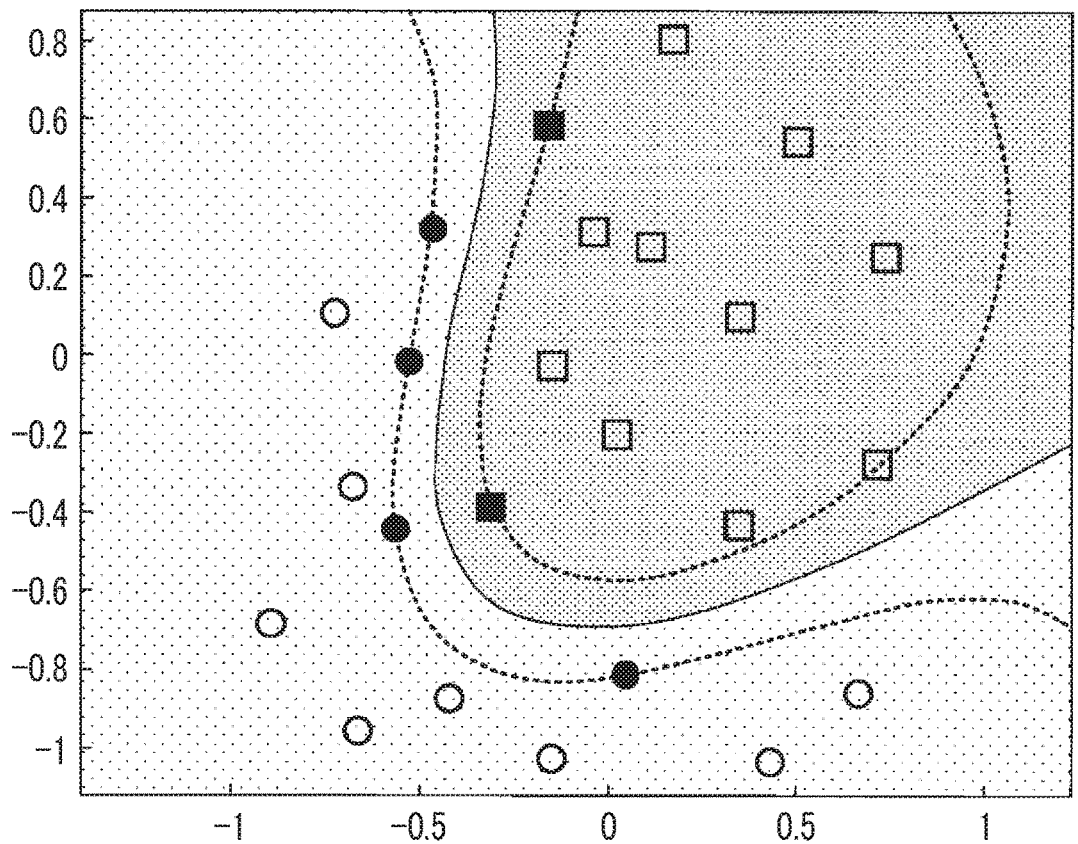
FIG. 7 is a map illustrating an example of learning data.

FIG. 7 is a map illustrating an example of learning data. In FIG. 7, white and black rectangles indicate the feature quantities of an unspecified large number of other people. White and black circles indicate the feature quantities extracted from the face images of the watched person.

The learning unit 52 specifies a boundary line between the watched person and an unspecified large number of other people regarding a feature quantity group shown in FIG. 7, and extracts feature quantities contributing to forming the boundary line. The extracted feature quantities correspond to support vectors. In FIG. 7, the black circles and rectangles are support vectors. The learning unit 52 takes a set of black circles and rectangles as learning data (that is, an identifier) of the watched person. As described above, learning data is smaller in data amount than the feature quantity of the face image of the watched person. Accordingly, learning data is generated, whereby reduction in network load or processing load can be expected. However, the feature quantity itself extracted from the face image of the watched person may be taken as learning data.

In a case where other specific information is input, learning is performed on images included in other specific information. A learning method may be the same as the learning method of the face image. For example, in a case where an image of clothes of the watched person is input, learning data (identifier) of clothes of the watched person may be generated based on a plurality of feature quantities extracted from the image of clothes and feature quantities extracted from images of a large number of other clothes registered in the dealer terminal 50 in advance.

Subsequently, the registration information transmission unit 53 transmits the registration information to the center 10 (S111). In the registration information, for example, the user ID, the password, the watching person's name, the watched person's name, the watching person's contact, the monitoring area information, learning data (learning data based on the face images and learning data based on other specific information), the electric wave ID, and the like input in the steps described above are included. For example, in a case where a monitoring area is set by a rectangle, the monitoring area information may be the latitude and longitude (that is, set of latitude and longitude) of each of diagonal vertexes of the rectangle. In a case where the electric wave ID is not input, the electric wave ID is not included in the registration information.

Figure 8:
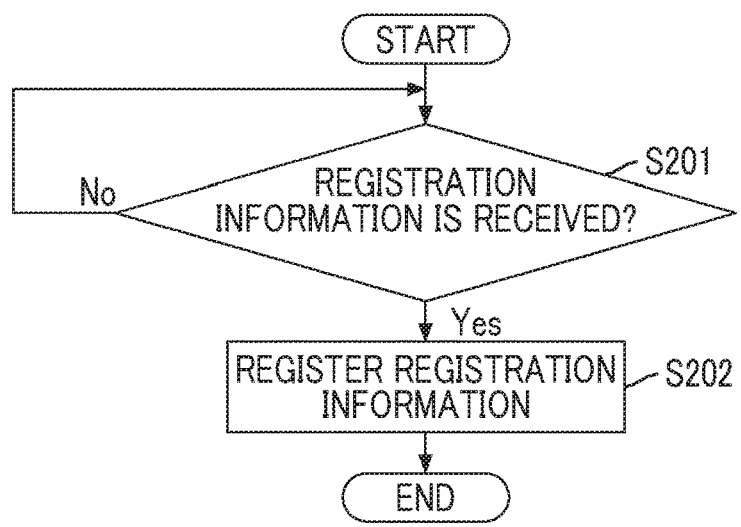
FIG. 8 is a flowchart illustrating an example of a processing procedure that the center executes at the time of reception of registration information.

A processing procedure that the center 10 executes with reception of registration information will be described. FIG. 8 is a flowchart illustrating an example of a processing procedure that the center 10 executes at the time of reception of registration information.

The registration information reception unit 11 of the center 10 is on standby for reception of registration information (S201). In a case where registration information transmitted from the registration information transmission unit 53 of any dealer terminal 50 is received (in S201, Yes), the registration information reception unit 11 registers a record including the registration information in the registration information storage unit 111 (S202).

FIG. 9 is a table showing a configuration example of the registration information storage unit 111. As shown in FIG. 9, each record of the registration information storage unit 111 includes registration information corresponding to a registration ID. The registration ID is identification information that is allocated for each piece of registration information.

Figures 10, 11:
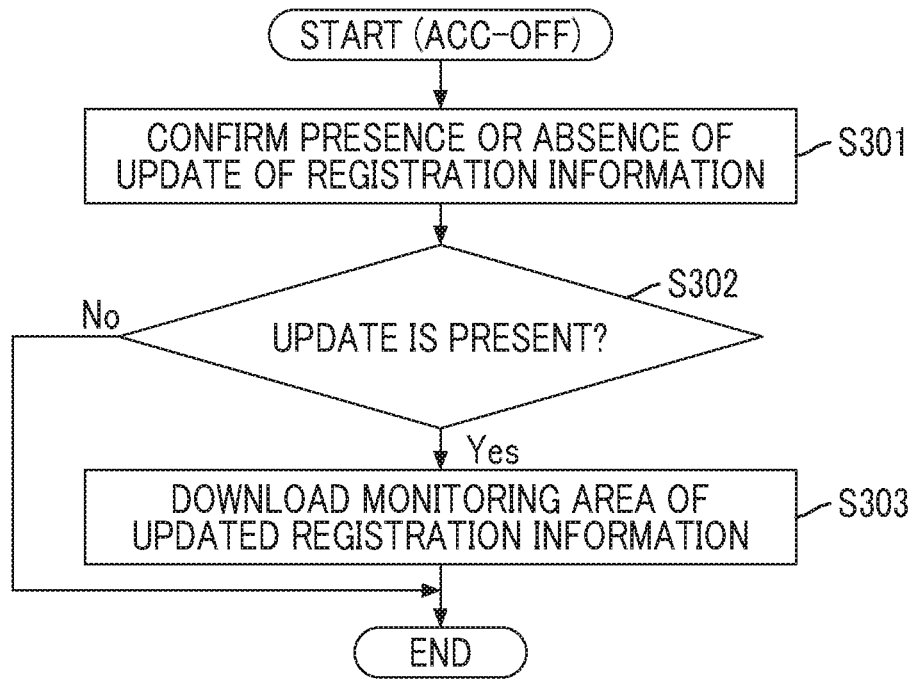
FIG. 10 is a flowchart illustrating an example of a processing procedure that the in-vehicle device executes according to an OFF operation of an accessory power supply.
FIG. 11 is a table showing a configuration example of a monitoring area storage unit.

A processing procedure that the in-vehicle device 20 executes will be described. FIG. 10 is a flowchart illustrating an example of a processing procedure that the in-vehicle device 20 executes with an OFF operation of an accessory power supply. The processing procedure of FIG. 10 may be executed by the in-vehicle device 20 of an unspecified vehicle 40. That is, the in-vehicle device 20 that executes the processing procedure of FIG. 10 may be limited to the in-vehicle device 20 of the vehicle 40 of any watching person.

In the vehicle 40, in a case where the OFF operation of the accessory power supply is performed, the monitoring area acquisition unit 22 of the in-vehicle device 20 mounted in the vehicle 40 transmits an inquiry of the presence or absence of update of registration information to the monitoring area transmission unit 12 of the center 10 (S301). In the inquiry, the registration ID of each monitoring area already stored in the monitoring area storage unit 211 is included. The monitoring area transmission unit 12 of the center 10 determines whether or not registration information including registration IDs other than the registration ID included in the inquiry is stored in the registration information storage unit 111 according to the inquiry. In a case where corresponding registration information is stored in the registration information storage unit 111, the monitoring area transmission unit 12 returns a response including all registration IDs of corresponding registration information to the monitoring area acquisition unit 22. In a case where corresponding registration information is not stored in the registration information storage unit 111, the monitoring area transmission unit 12 returns, to the monitoring area acquisition unit 22, a response indicating that there is no new registration information.

Subsequently, the monitoring area acquisition unit 22 determines the presence or absence of update of registration information based on the response from the monitoring area transmission unit 12 (S302). In a case where the response indicates that there is no new registration information (in S302, No), the monitoring area acquisition unit 22 ends the processing of FIG. 10.

In a case where one or more registration IDs are included in the response (in S302, Yes), the monitoring area acquisition unit 22 downloads the monitoring area information of the registration information related to all registration IDs included in the response from the center 10 (S303). That is, the monitoring area acquisition unit 22 transmits an acquisition request of the monitoring area information to the monitoring area transmission unit 12 of the center 10. In the acquisition request, each registration ID included in the response is included. The monitoring area transmission unit 12 returns the monitoring area information included in the registration information (FIG. 9) related to each registration ID included in the acquisition request in association with each registration ID. The monitoring area acquisition unit 22 stores each received monitoring area information in the monitoring area storage unit 211 in association with the registration ID associated with the monitoring area information.

FIG. 11 is a table showing a configuration example of the monitoring area storage unit 211. As shown in FIG. 11, in the monitoring area storage unit 211, a result of extracting the registration ID and the monitoring area information from the registration information stored in the registration information storage unit 111 of the center 10 is stored.

The monitoring area information to be acquired may be limited to monitoring area information related to a monitoring area, a part or the whole of which overlaps within a predetermined range from the current position of the vehicle 40. In this way, it is possible to prevent acquisition of monitoring area information related to an area having a relatively low possibility of becoming a movement destination of the vehicle 40, and to further reduce a network load, a processing load of the in-vehicle device 20, or the like. In this case, the monitoring area acquisition unit 22 may include the positional information of the current position of the vehicle 40 in the acquisition request of the monitoring area information in addition to the registration ID. The monitoring area transmission unit 12 of the center 10 may return monitoring area information related to a monitoring area, a part or the whole of which overlaps within a predetermined range from a position of the positional information, among the monitoring area information included in the registration information (FIG. 9) related to each registration ID included in the acquisition request.

A processing procedure that the in-vehicle device 20 executes when the accessory power supply is ON in the vehicle 40 will be described.

Figure 12:
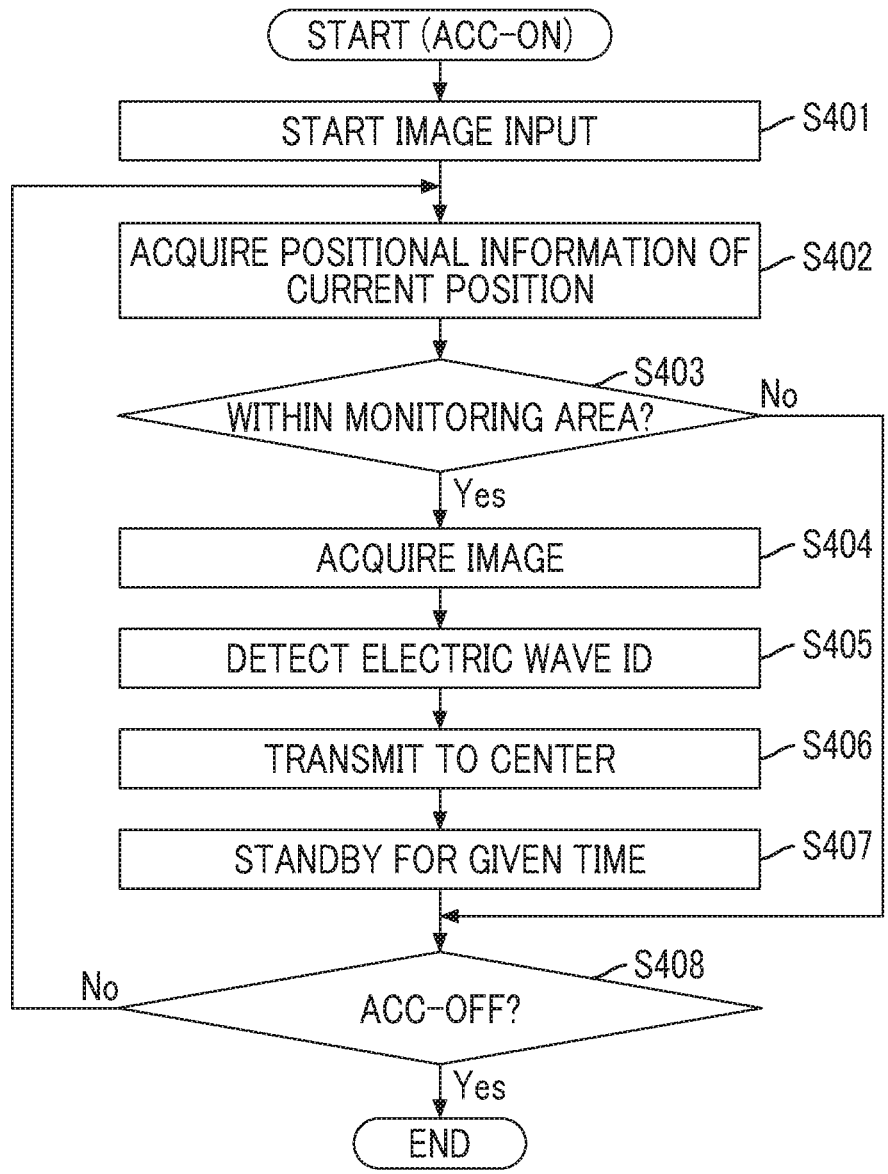

FIG. 12 is a flowchart illustrating an example of a processing procedure that the in-vehicle device 20 executes when the accessory power supply (ACC) is ON.

In a case where the accessory power supply is ON, the image input unit 21 starts an input of images (moving image) captured by the camera 30 (S401). The input moving image is continuously stored in the image storage unit 212. In a case where the capacity of the image storage unit 212 is insufficient, overwriting to an old moving image may be performed.

Subsequently, the position acquisition unit 23 acquires the positional information (latitude and longitude) of the current location (current position) of the vehicle 40 from the GPS receiver 208 (S402). After Step S402, the processing procedure of FIG. 12 is repeated even during traveling of the vehicle 40. Accordingly, the positional information acquired in Step S402 may be different each time.

Subsequently, the extraction determination unit 24 determines whether or not the current position indicated by the positional information acquired by the position acquisition unit 23 is within a monitoring area indicated by any monitoring area information stored in the monitoring area storage unit 211 (S403).

In a case where the current position is within any monitoring area (in S403, Yes), the image extraction unit 26 acquires a still image (hereinafter, referred to as "image data") of a portion corresponding to the current time from the moving image stored in the image storage unit 212. Subsequently, the electric wave detection unit 25 attempts to detect an electric wave of short-range wireless communication, such as Bluetooth (Registered Trademark) (S405). In a case where the electric wave can be detected, the electric wave ID of the electric wave is acquired.

Subsequently, the monitoring data transmission unit 27 transmits monitoring data including the positional information acquired in Step S402, the image data acquired in Step S404, and the current date and time to the center 10 (S406). At this time, in a case where the electric wave ID is acquired in Step S405, the electric wave ID is also included in the monitoring data. A list of one or more registration IDs corresponding to each monitoring area that is determined as including the current position in Step S403 may be transmitted to the center 10 along with the monitoring data.

Subsequently, the monitoring data transmission unit 27 is on standby for a given time (S407). The standby for the given time is to suppress the amount of monitoring data transmitted in a period during which the vehicle 40 is located within any monitoring area. That is, since it is considered that there is a relatively low need for the watching person to know the situation of the watched person in each short period, such as at one second interval, transmission of excessive monitoring data to a request of a user causes an increase in unneeded network load and processing load. In a case where the objective can be attained, Step S407 may be substituted with other processing. For example, a standby may be performed until the vehicle 40 moves at a predetermined distance.

The processing after Step S402 is repeated until the OFF operation of the accessory power supply in the vehicle 40 is performed (S408). In a case where the OFF operation of the accessory power supply in the vehicle 40 is performed (in S408, Yes), the processing of FIG. 12 ends. In this case, the processing described in FIG. 10 is performed.

Since various kinds of data communication with relatively low relevance to the embodiment are generated between the in-vehicle device 20 and the center 10 during traveling of the vehicle 40, transmission (S406) of monitoring data to the center 10 may be performed after the OFF operation of the accessory power supply (that is, in the processing procedure of FIG. 10). In this case, in Step S406, the monitoring data transmission unit 27 may store the monitoring data in the auxiliary storage device 202 of the in-vehicle device 20, or the like.

A processing procedure that the center 10 executes with reception of monitoring data transmitted in Step S406 will be described.

Figures 13, 14:
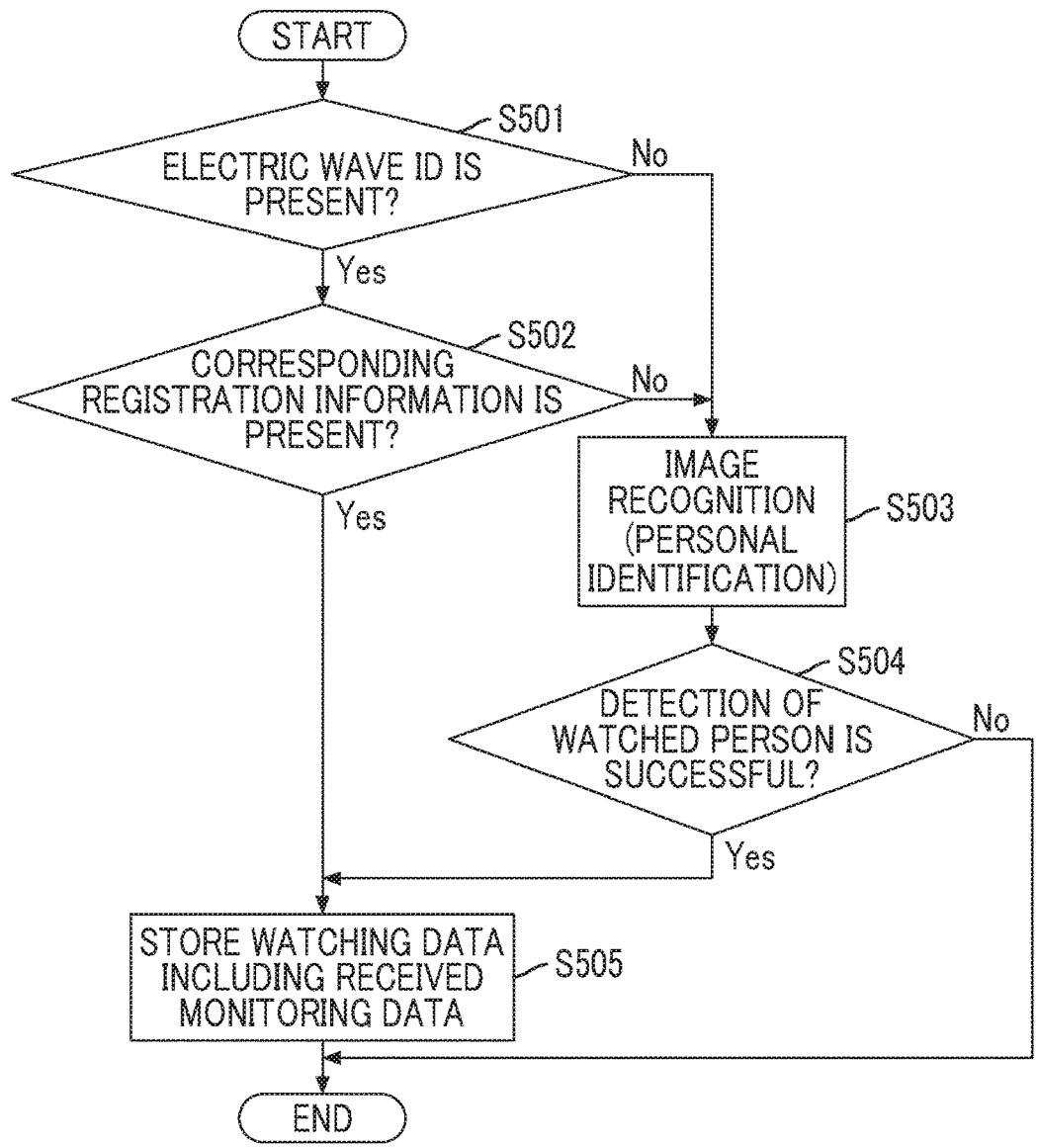
FIG. 13 is a flowchart illustrating an example of a processing procedure that the center executes with reception of monitoring data.
FIG. 14 is a table showing a configuration example of a watching data storage unit.

FIG. 13 is a flowchart illustrating an example of a processing procedure that the center 10 executes with reception of monitoring data.

In a case where monitoring data is received by the monitoring data reception unit 13, the recognition unit 14 determines whether or not the electric wave ID is included in the monitoring data (S501). In a case where the electric wave ID is included in the monitoring data (in S501, Yes), the recognition unit 14 determines whether or not registration information including the same electric wave ID as the electric wave ID is stored in the registration information storage unit 111 (FIG. 9) (S502). In a case where there is corresponding registration information (in S502, Yes), the recognition unit 14 stores data having the registration ID of the registration information and the monitoring data associated with each other as watching data in the watching data storage unit 112 (S505). That is, in this case, since image data included in the monitoring data is captured when a portable terminal of the watched person related to the registration information stays around the vehicle 40 as a transmission source of the monitoring data, estimation is made that an image of the watched person is included in the image data. With this, the monitoring data is stored in the watching data storage unit 112 in association with the registration ID of the registration information.

FIG. 14 is a table showing a configuration example of the watching data storage unit 112. As shown in FIG. 14, each record of the watching data storage unit 112 includes fields of a registration ID, image data, positional information, date and time, and the like. In Step S505, one record including the registration ID of registration information including the same electric wave ID as the electric wave ID included in received monitoring data, image data included in the monitoring data, positional information, and the date and time is stored as watching data in the watching data storage unit 112. The electric wave ID included in the monitoring data may not be included in the watching data.

In a case where the electric wave ID is not included in the received monitoring data (in S501, No), or in a case where there is no registration information including the same electric wave ID as the electric wave ID included in the monitoring data (in S502, No), the recognition unit 14 performs image recognition on the image data included in the monitoring data using learning data of each piece of registration information stored in the registration information storage unit 111 (FIG. 9). With this, the recognition unit 14 attempts to detect any watched person from the image data (personal identification of any watched person) (S503). Specifically, the recognition unit 14 detects a portion corresponding to a face of a person in the image data included in the monitoring data and extracts a feature quantity from the portion. The recognition unit 14 obtains a probability that each piece of learning data corresponds to the same person as the feature quantity based on comparison of the extracted feature quantity with the learning data included in each piece of registration information (learning data based on the face images). As an image, the probability is obtained by determining whether or not the feature quantity is included within any boundary among the boundaries formed based on the learning data. In a case where there is registration information including learning data having the highest probability and the probability exceeding a threshold α, the recognition unit 14 determines that the image of the watched person related to the registration information is included in the image data included in the monitoring data. That is, the watched person is detected on the image data.

In a case where there is no corresponding registration information, a probability that learning data based on an image of clothes, an image of belongings, or the like among the learning data included in each piece of registration information coincides with clothes or belongings included in the image data included in the monitoring data may be obtained, and the threshold α may be adjusted according to the probability. For example, in a case where the probability is less than the threshold α regarding registration information having the highest probability to the learning data based on the face images, and in a case where the probability to the learning data based on the image of clothes regarding the registration information is extremely large (for example, a case where the probability is greater than a threshold β), the threshold α to the face images may be lowered. As a result, in a case where the probability to the learning data based on the face images is greater than the threshold α, determination may be made that the learning data is learning data related to the same person as the image data included in the monitoring data.

At this time, in a case where the list of the registration IDs is received along with the monitoring data, improvement of efficiency of processing may be achieved by subjecting solely learning data of registration information related to the registration IDs included in the list to image recognition.

In regard to personal identification using image data, there are a large number of known techniques. Accordingly, the processing of Step S503 may be substituted with other known techniques.

In a case where any watched person can be detected on the image data (in S504, Yes), the recognition unit 14 stores watching data including the registration ID of registration information corresponding to the watched person and the received monitoring data in the watching data storage unit 112 (S505). In a case where any watched person cannot be detected on the image data (in S504, No), the monitoring data is discarded.

In the processing procedure of FIG. 13, an example where, in a case where the electric wave ID is included in the monitoring data, the monitoring data is stored as watching data without performing Step S503 based on estimation that the watched person related to the registration information including the electric wave ID is included in the image data of the monitoring data is shown. However, in a case where the electric wave ID is included in the monitoring data, image recognition may be performed on the image data included in the monitoring data using learning data included in registration information including the electric wave ID. As a result, in a case where the watched person related to the registration information can be detected in the image data, watching data including the monitoring data may be stored in the watching data storage unit 112.

The processing procedure of FIG. 13 may be executed in a batch, for example, regularly or each time a predetermined number of pieces of monitoring data are received. In this case, the processing procedure of FIG. 13 may be executed on each piece of monitoring data received in a regular period or each of a predetermined number of pieces of monitoring data.

For example, the watching information providing unit 15 may transmit electronic mail including positional information of watching data to a mail address indicated by the watching person's contact included in registration information related to the registration ID included in the watching data stored at the timing of Step S505. That is, the positional information of the watched person may be instantaneously notified to the watching person. In this case, a situation in which complicatedness is given to the watching person may be prevented by restricting a notification timing. For example, electronic mail may not be transmitted for a predetermined period after electronic mail is transmitted last, or positional information within a predetermined distance from positional information notified last may not be notified.

An example of a processing procedure that is executed when the center 10 outputs a history of positions of a watched person according to a request from the watching person will be described.

Figure 15:
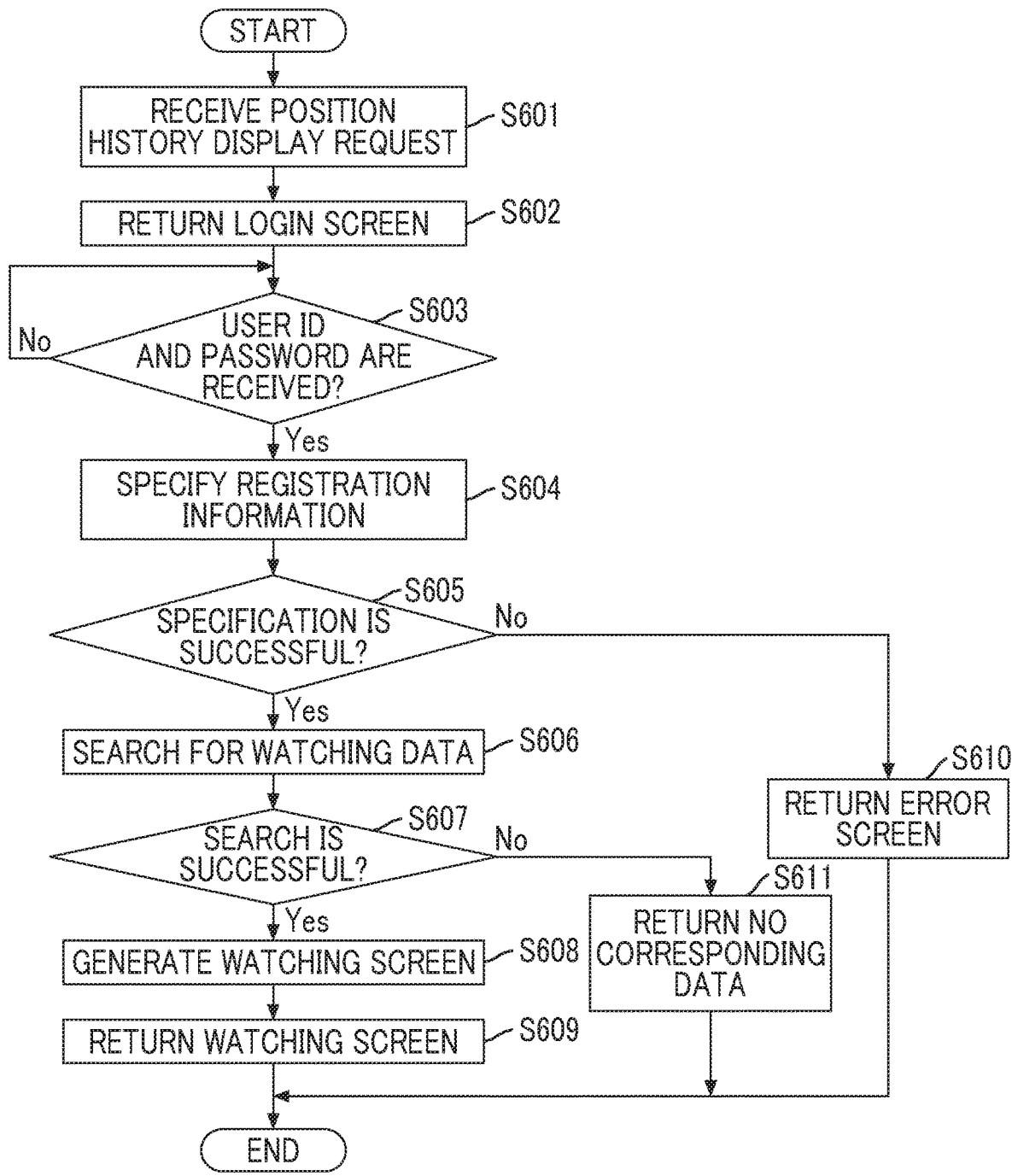
FIG. 15 is a flowchart illustrating an example of a processing procedure of output processing of a history of positions of a watched person.

FIG. 15 is a flowchart illustrating an example of a processing procedure of output processing of a history of positions of a watched person.

For example, in a case where a display request of a position history of a watched person transmitted from a terminal (hereinafter, referred to as a "watching person's terminal") used by any watching person is received (S601), the watching information providing unit 15 returns screen data of a login screen to the watching person's terminal (S602). In the watching person's terminal, the login screen is displayed based on the screen data. For example, the display request may be transmitted from the watching person's terminal with an input of a predetermined uniform resource locator (URL) on a Web browser displayed in the watching person's terminal. In this case, the screen data may be a Web page constituted of hyper text markup language (HTML) data or the like.

Subsequently, the watching information providing unit 15 is on standby for reception of the user ID and the password (S603). In a case where the user ID and the password input to the login screen in the watching person's terminal are received, the watching information providing unit 15 specifies registration information including the user ID and the password from among the registration information stored in the registration information storage unit 111 (S604).

In a case where corresponding registration information is not specified (in S605, No), screen data of an error screen indicating that the user ID and the password are incorrect is returned to the watching person's terminal (S610).

In a case where determination is made that corresponding registration information (hereinafter, referred to as "target registration information") is specified (in S605, Yes), the watching information providing unit 15 searches the watching data storage unit 112 for watching data including the registration ID of the target registration information (S606). For example, watching data may be searched with three or five pieces as an upper limit in a descending order of the date and time. Alternatively, designation of a range of the date and time may be made possible in the watching person's terminal, and all pieces of watching data including the date and time within the range may be searched.

In a case where there is no corresponding watching data (in S607, No), watching information providing unit 15 returns screen data of a screen indicating that there is no corresponding data to the watching person's terminal (S611). In a case where one or more pieces of watching data are searched (in S607, Yes), the watching information providing unit 15 generates screen data of a watching screen including a map on which a predetermined object is disposed at a position indicated by the positional information of each piece of searched watching data, for example, in a map of range including the monitoring area of the target registration information (S608). The object may be, for example, a predetermined figure or a thumbnail of image data included in each piece of watching data. The screen data may be generated such that, when the object is selected, the image data and the date and time of the watching data including the positional information corresponding to the position of the object and the date and time are displayed.

Subsequently, the watching information providing unit 15 returns the generated screen data to the watching person's terminal (S609). As a result, a watching screen is displayed in the watching person's terminal, and the watching person can confirm the history of the positions of the watched person.

In the above description, an example where the monitoring area is fixedly set in advance has been described. However, for example, in a case where a predetermined range (for example, several km square) from a position related to positional information included in final monitoring data relating to a certain watched person protrudes from a monitoring area related to the watched person, the monitoring area may be expanded so as to include the predetermined range. The processing described above may be performed, for example, each time the monitoring data reception unit 13 receives monitoring data.

In the embodiment, although an example where the center 10 has the recognition unit 14 has been described, the in-vehicle device 20 may have the recognition unit 14. That is, the in-vehicle device 20 may perform image recognition. In this case, monitoring data may not be transmitted to the center 10, and watching data may be transmitted to the center 10.

As described above, according to the embodiment, image data captured in a monitoring area set for each watched person is taken as a processing target. Accordingly, it is possible to improve efficiency of monitoring using captured images.

In the embodiment, since the position of the watched person is specified based on image data by the camera 30 mounted in the vehicle 40, it is possible to specify the position of the watched person even though the watched person does not have a specific transmitter or the like.

In the embodiment, the center 10 or the in-vehicle device 20 is an example of an information processing apparatus. The monitoring data reception unit 13 or the image extraction unit 26 is an example of an acquisition unit. The recognition unit 14 is an example of a determination unit. The watching information providing unit 15 is an example of a providing unit. The camera 30 is an example of an imaging device.

What is claimed is:

1. An information processing apparatus comprising a CPU configured to:
   register information of a first person and a monitoring area which is a geographical range designated as a range for monitoring the first person as desired by a second person;
   acquire an image captured by an imaging device mounted in a vehicle within the geographical range; and
   perform image recognition on the acquired image to determine whether or not the first person is included in the acquired image based on the registered information of the first person and the geographical range,
   wherein the first person is the person to be monitored, and the second person is the person who monitors the first person, and
   wherein in a case where a predetermined range from a position related to positional information included in final monitoring data relating to a certain watched person protrudes from the monitoring area related to the first person, the monitoring area is expanded so as to include the predetermined range.

2. The information processing apparatus according to claim 1, wherein the geographical range is specified based on a predetermined district, a range designated using a map, or a history of positional information recorded in a predetermined portable terminal.

3. The information processing apparatus according to claim 1, wherein the geographical range is set as desired in a terminal connected through a network.

4. The information processing apparatus according to claim 1, wherein an agreement on acquisition of an image of the first person is made in advance, and the image recognition is performed on the acquired image of the first person.

5. The information processing apparatus according to claim 1, wherein the image recognition is performed using first information extracted from a face image of the first person or second information extracted from an image of an article on the first person and the first information.

6. The information processing apparatus according to claim 1, wherein:
   the CPU acquires the image captured by the imaging device and positional information indicating a position where the image is captured; and
   when the first person is included in the acquired image, the CPU stores the positional information in a storage in association with the first person.

7. The information processing apparatus according to claim 6, wherein according to a request from a terminal of the second person through a network, the CPU provides the terminal with the positional information stored in the storage.

8. An information processing method comprising:
   by a computer, register information of a first person and a monitoring area which is a geographical range designated as a range for monitoring the first person as desired by a second person;
   by a computer, acquiring an image captured by an imaging device mounted in a vehicle within the geographical range; and
   by the computer, performing image recognition on the acquired image to determine whether or not the first person is included in the acquired image based on the registered information of the first person and the geographical range,
   wherein the first person is the person to be monitored, and the second person is the person who monitors the first person, and
   wherein in a case where a predetermined range from a position related to positional information included in final monitoring data relating to a certain watched person protrudes from the monitoring area related to the first person, the monitoring area is expanded so as to include the predetermined range.

9. An information processing system that includes an in-vehicle device mounted in a vehicle, and an information processing apparatus configured to perform communication with the in-vehicle device through a network, wherein
   the in-vehicle device or the information processing apparatus is configured to register information of a first person and a monitoring area which is a geographical range designated as a range for monitoring the first person as desired by a second person;
   the in-vehicle device or the information processing apparatus is configured to acquire an image captured by an imaging device mounted in the vehicle within the geographical range; and
   the in-vehicle device or the information processing apparatus is configured to perform image recognition on the acquired image to determine whether or not the first person registered in advance is included in the acquired image based on the registered information of the first person and the geographical range,
   wherein the first person is the person to be monitored, and the second person is the person who monitors the first person, and
   wherein in a case where a predetermined range from a position related to positional information included in final monitoring data relating to a certain watched person protrudes from the monitoring area related to the first person, the monitoring area is expanded so as to include the predetermined range.

* * * * *